Oct. 13, 1936.  W. F. BLEECKER  2,057,226
METHOD OF AND APPARATUS FOR PROPORTIONING FLUID MIXTURES
Filed Sept. 27, 1934  2 Sheets-Sheet 2
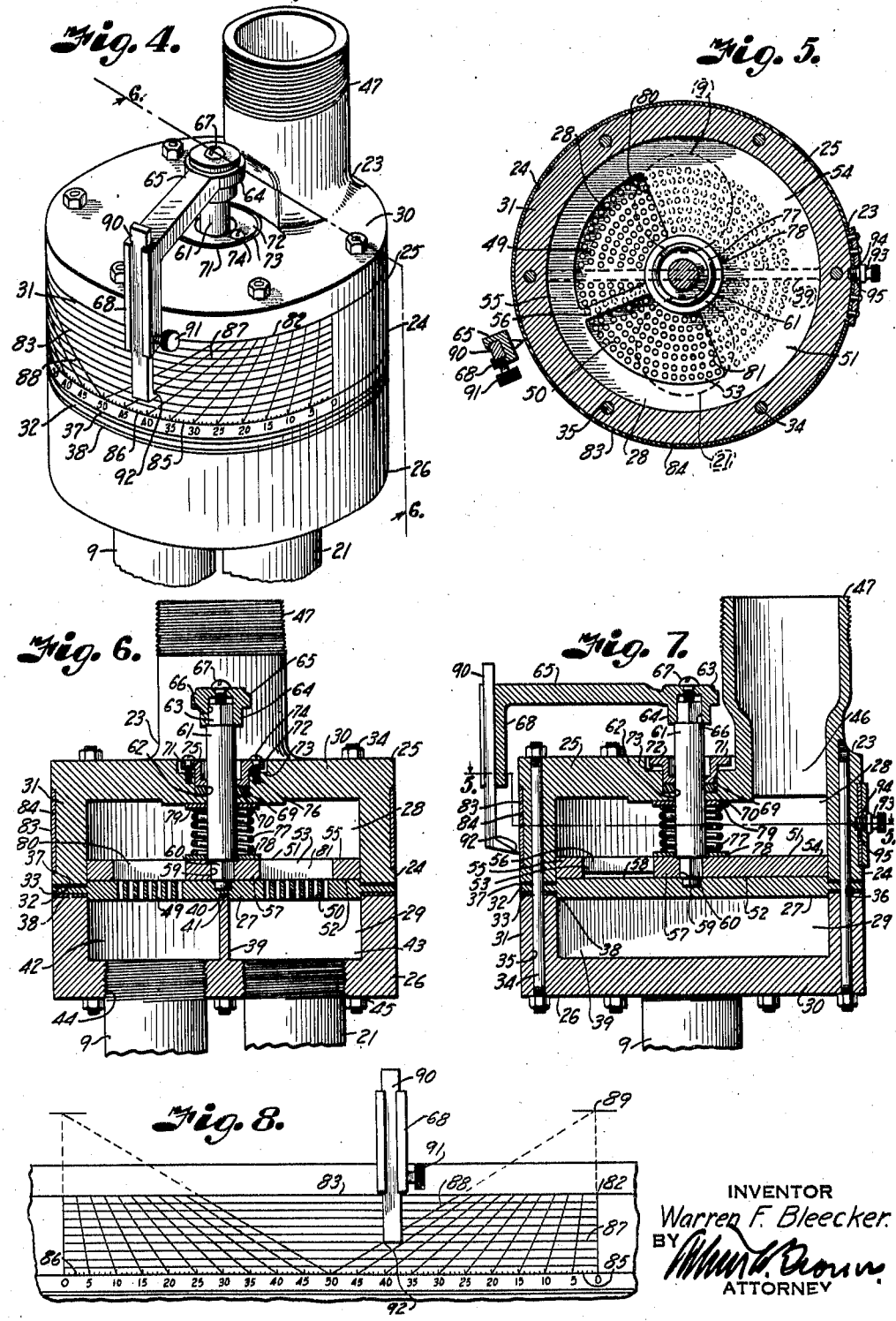
INVENTOR
Warren F. Bleecker
BY
ATTORNEY Patented Oct. 13, 1936

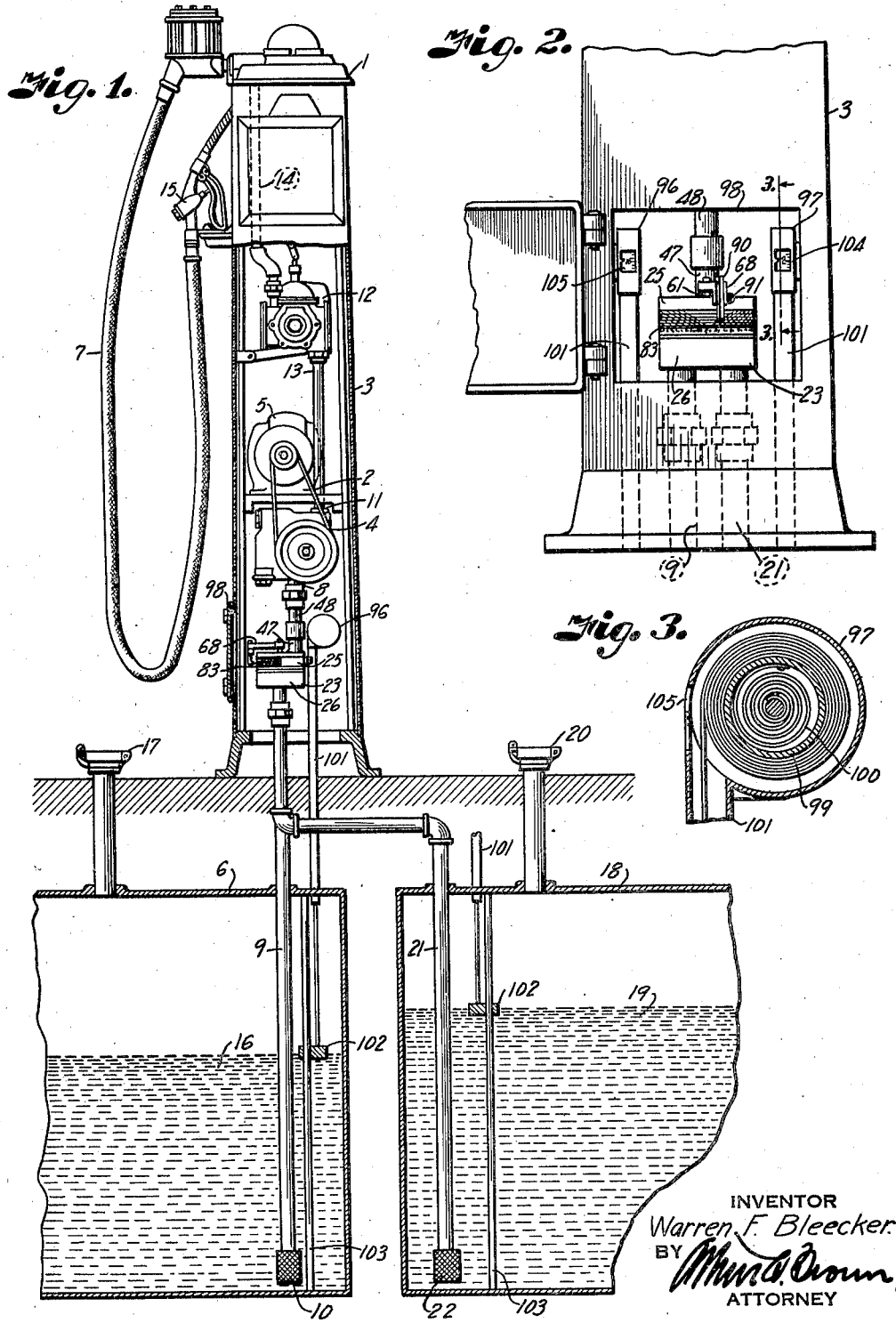

2,057,226

UNITED STATES PATENT OFFICE 2,057,226

METHOD OF AND APPARATUS FOR PROPORTIONING FLUID MIXTURES

Warren F. Bleecker, Tulsa, Okla., assignor to William J. Cheley, Longmont, Colo.

Application September 27, 1934, Serial No. 745,761

21 Claims. (Cl. 137—165)

This invention relates to a method of and apparatus for proportioning fluid mixtures and particularly for blending motor and like fuels to control their volatility in accordance with weather conditions.

It is well known that weather conditions, particularly temperature, affect the quality of gasoline required for efficient operation of present day internal combustion engines and particularly those employed in motor vehicles. For example, if a highly volatile fuel is used in hot weather, vapor lock results and if fuel of low volatility is used in cold weather, starting difficulties are encountered. To overcome these difficulties, volatility of the fuel is controlled by blending a fuel of low volatility with one of high volatility so that a correct fuel may be supplied for a given temperature.

The present method is for the refinery to prepare the required blend in accordance with advance weather predictions in order that an approximate blend is available to meet the prevailing weather condition at the time the fuel is delivered to the point of use. It is, therefore, evident that there must be a lag of several weeks between the preparation of the blend and the time of its use and since weather conditions are very uncertain, the method is haphazard and far from satisfactory.

It is, therefore, the principal object of the present invention to provide accurate blending of liquids of different characteristics, for example, liquids of high and low volatility, at the time the liquids are dispensed so that the proper blend may be provided according to requirements, or the prevailing weather conditions, as the case may be.

It is a further object of the invention to provide for maintaining a predetermined ratio of the liquids incidental to their conduction from the supply tanks to the dispensing apparatus.

It is also an important object of the invention to provide a proportioning device which is readily introduced into any standard dispensing system.

In accomplishing these and other objects of the invention, in the practice of my improved method, I have provided a novel apparatus, illustrated in the accompanying drawings, wherein:

Fig. 1 is a vertical sectional view through an apparatus for dispensing motor fuels which is equipped with a blending device constructed in accordance with the present invention.

Fig. 2 is a fragmentary elevational view of the base portion of the pump unit, particularly illustrating the gauges for determining the relative levels of liquids contained in the supply tanks.

Fig. 3 is an enlarged sectional view through one of the gauge units on the line 3—3, Fig. 2.

Fig. 4 is an enlarged detail perspective view of the blending device.

Fig. 5 is a horizontal sectional view through the blending device on the line 5—5, Fig. 7.

Fig. 6 is a vertical section through the blending device on the line 6—6, Fig. 4.

Fig. 7 is a similar section taken at right angles to the section shown in Fig. 6.

Fig. 8 is a diagrammatic development of the scale for compensating for errors incidental to variation in liquid levels in the respective supply tanks.

Referring more in detail to the drawings:

1 designates a conventional fuel dispensing apparatus as employed in present day service stations for supplying fuel to motor vehicles. The apparatus comprises a pump unit 2 that is housed in a casing 3 and includes a pump 4 operated by a suitable motor 5 to draw the liquid from an underground supply tank 6 for flow through a hose 7 into the fuel tank of a motor vehicle, the inlet 8 of the pump being ordinarily connected directly with a suction line 9 extending through the top of the supply tank and terminating near the bottom thereof where it is provided with a strainer 10. The discharge connection 11 of the pump is connected to the hose 7 through a metering device 12 by means of pipes 13 and 14.

When the motor 5 is energized to operate the pump 4, fuel is drawn from the tank 6 through the pipe 9 and discharged through the metering devise for flow through the hose 7 under control of a switch and valve mechanism 15 provided on the outlet end of the hose as indicated in Fig. 1 in accordance with present practice of dispensing motor fuels.

In carrying out the present invention, I utilize the tank 6 for containing one of the fuels to be blended, for example, a fuel of high volatility as indicated at 16, and which is inserted into the tank through an inlet connection 17. I also connect with the system a second tank 18 which contains a fuel of low volatility as indicated at 19 and which is inserted into the tank through a filling connection 20. The tank 18 is preferably located at the same level as the tank 6 and is provided with a suction pipe 21 similar to the pipe 9 previously described having a strainer 22 at its inlet end located at substantially the same level as the strainer 10 for the pipe 9. Interposed in the line 9 and interconnected with the pipe 21 is a blending device 23 for automatically proportioning the amounts of the respective fuels drawn from the tanks 6 and 18, as now to be described.

The blending or proportioning device includes a housing 24 preferably formed of complementary, facing, cup-shaped sections 25 and 26, separated by a partition plate 27 to form chambers 28 and 29, respectively.

Each of the housing sections includes a disk shaped portion 30 forming outer end walls of the respective chambers and integral peripheral flanges 31 forming annular walls of the chambers.

The partition 27 conforms in shape to the disk shaped portions of the sections and has a reduced peripheral portion 32 that is clamped between the complementary faces 33 of the flanges 31 by means of stud bolts 34 extending through openings 35 in the respective sections and through aligning openings 36 in the reduced portion 32 as best illustrated in Fig. 7, gasket rings 37 and 38 being preferably inserted between the faces 33 and the opposite sides of the partition to form leak proof joints therebetween.

The chamber 29 is divided diametrically thereof by a partition 39, formed integrally with the housing section 26 and has its upper edge extending into a transverse groove 40 formed in the adjacent face of the partition plate 27, a gasket strip 41 being preferably inserted between the bottom of the groove and the edge of the partition 39 to prevent leakage therebetween. The partition 39 thus divides the chamber 29 into substantially semi-cylindrical cells 42 and 43 of equal capacity and which are respectively connected to the pipes 9 and 21 by threading the ends of the pipes in threaded openings 44 and 45 provided in the disk shaped portion 30 of the section 26.

The inlets to each of the cells 41 and 42 are equal in flow capacity to that of the pump inlet in order that the full volume of the pump may be drawn through either one of the cells as later described.

The compartment 28 is provided with an outlet port 46 having flow capacity equal in size to the inlet of the cells. The outlet port 46 is preferably located in the disk portion 30 of the section 25 and communicates with a nipple 47 preferably formed as an integral part of the housing section, the nipple 47 being connected with a pipe section 48 connecting the blending device with the inlet 8 of the pump 4.

In order to pass the liquid from the respective cells through the plate 27, it is provided with spaced groups 49 and 50 of apertures arranged on the respective sides of the partition 39 as best illustrated in Fig. 5. The combined area of all of the apertures in each group is preferably equal in flow capacity to the maximum flow through the housing, as controlled by the inlets to the respective cells and outlet 46 of the chamber 28.

To selectively regulate the amounts of liquid drawn through the respective groups of apertures, the compartment 28 contains a rotary valve plate 51 having a face 52 seated against the upper face of the partition plate 27 and which is provided with a substantially semi-circular port 53 conforming to the arrangement of the apertures in either one of the respective groups, so that when the port 53 is in registry with one of the groups, the other group will be valved off by the body portion 54 of the plate and all of the flow is from the cell with which the ports 53 are in communication.

In order to reinforce the rim 55 of the valve plate extending beyond the arcuate edge of the port, a connecting bar 56 connects the rim with the hub portion 57. The connecting bar 56 is, however, spaced from the seating face of the partition 27 as shown at 58 of Fig. 7, so that it does not interfere with flow of the underlying apertures. The flow is, therefore, effective through all of the apertures which align with the port of the valve disk.

In order to rotate the valve disk over the respective groups of apertures, the axis thereof is provided with a polygonally shaped opening 59 for receiving a similarly shaped end 60 of an actuating stem 61 that is rotatably mounted in a bearing opening 62 located in the axis of the disk portion of the housing section 25. The actuating stem projects from the housing and is provided with a polygonally shaped end 63 for mounting the hub 64 of an actuating lever 65. The hub 64 has a socket 66 conforming to the shape of the end of the actuating stem and is retained thereon by a screw 67 extended through an opening in the hub and into a threaded opening in the stem.

The opposite end of the lever extends outwardly beyond the periphery of the housing and terminates in a downwardly extending head portion 68 for a purpose later described.

To seal the bearing opening about the periphery of the actuating stem, the bearing opening is counterbored to form a recess 69 for containing a packing ring 70 that is urged into sealed relation with the actuating stem by a follower 71 bearing thereagainst and having a flanged upper end 72 positioned in a recess 73 provided in the upper face of the housing section. The follower is retained in functional position by fastening devices 74 extending through openings 75 in the flange 72 and into threaded openings 76 in the section 25 as shown in Fig. 6.

In order to retain the valve plate in seated relation with the partition plate, I provide a coil spring 77 sleeved over the actuating stem and having one end bearing against a washer 78 engaging against the valve plate and its other end bearing against a similar washer 79 seated against the inner face of the disk portion 30 of the housing section 25.

It is thus apparent that when the lever 65 is rotated to move the valve plate so that the port 53 registers with the group of apertures forming the outlet to the cell 42, all of the flow will be from the tank containing the highly volatile fluid because the body portion 54 of the valve plate has closed communication with the group of ports 50 forming outlet to the cell 43.

Likewise, when the port is in registry with the group of ports 50, the body portion of the valve plate closes the other group of ports so that all of the flow is from the tank 19 containing the low volatile fluid.

If the valve is rotated so that the port is in registry with selective apertures in both groups of ports, as shown in Fig. 5, flow will be established through the effective apertures of each group in proportion to the number of apertures exposed through the port. If the valve is moved from any one set position, the radial edge 80 at the end of the port will close or uncover the same number of apertures as are closed or uncovered by the edge 81 at the opposite end of the port to vary the ratio from the exclusive flow of either one of the tanks to a fifty-fifty ratio from each of the tanks.

It is thus apparent that any percentage of gasoline blend may be provided merely by regulating the position of the valve relatively to the respective groups of ports.

In order to maintain definite ratios, it is necessary that the areas of the exposed apertures should at all times approximate the area of the outlet port 46. If the area of the exposed apertures is too great, the sensitiveness of the apparatus is impaired. The size of the apertures is also of great importance and has a definite bearing on the accuracy of the blends.

From my experiments, I have found that the size of the apertures should have an area of .0045 of a square inch or less to create a friction or wire drawing effect through the apertures which in a large degree is responsible for the effectiveness and efficiency of the apparatus.

It appears from tests that this friction set up by flow of fluid through the small apertures should be of such order of magnitude as compared with the friction of the entire pumping system that it affords an effective and sure means of controlling the flow. This feature takes on an added importance when as a practical condition, the fuel in the supply tanks is at different levels.

An essential element of my invention is, therefore, the recognition of the importance of the proper size and number of these apertures. The number and size of the apertures also affect the correct proportion of gasoline as the levels in the two supply tanks vary. For example, I find that if the apertures are as large as .082 inch in diameter, and the area of the apertures exposed is approximately equivalent to the area of the port 46, and that the same level of fuel in the supply tank which is connected to that cell having the least number of apertures exposed is higher than the level in the other tank, the amount of liquid actually drawn is greater than it should be.

This results in a variable error which must be taken into account by means of a scale presently described.

The larger the apertures and the greater the number, the greater this progressive error becomes. The error also increases as the difference in levels in the two supply tanks increases.

To make this clearer, let us assume that the plate is set to deliver 10 per cent through one group of apertures and 90 per cent through the other group of apertures and that the levels in the supply tanks are equal. The ratio of the liquid passing through each cell under this condition of equal levels is directly proportionate to the number of apertures exposed in each group.

Now, assuming that the level of liquid is raised in the tank 18 ten inches above the level in the tank 6, then more than 10 per cent of the liquid will flow through the exposed group of apertures 50 owing to the greater hydrostatic level of liquid in the tank 18 and as the difference in levels is increased, the quantity of liquid delivered from the tank 18 will correspondingly increase.

Assuming that the amount of increase is 2 per cent of the total of the amount now drawn through the exposed group of apertures 50, which has been set to draw 10 per cent, the actual flow will now be 12 per cent rather than 10 per cent.

It is, therefore, desirable to provide adjustment of the valve setting so that the flow will be in the proper proportions regardless of the differences in heads of liquid in the respective tanks.

The recognition of this phenomenon is, however, only secondary to the matter of the area of the apertures as above mentioned because this error becomes actually less as the total area of the apertures exposed and the diameter of the apertures is decreased.

It is proposed to compensate for this error within practical limits by providing the side of the housing with a scale 82 which includes a band 83 seated in an annular groove 84 extending about the periphery of the housing section 25 as best illustrated in Figs. 5 and 6.

Printed or otherwise formed in the band is a base line 85 which in the illustrated instance is divided into 100 equal divisions as indicated at 86 with the central division designated "50". The other divisions to the right and left are numbered successively by fives from "45" to "0", each division representing one percent of one-half of the number of apertures exposed so that when the pointer is set at "50", the ratio drawn from the supply tanks will be fifty-fifty and, for example when the pointer is set at "15" to the left of the mark "50", the percentage will be 15 per cent from the tank 18 and 85 per cent from the tank 6. Or by setting the pointer on the opposite end of the scale, the proportions may be such that the greater volume is drawn from the tank 6.

As long as the level of the liquids in the respective tanks remains the same, these proportions are substantially accurate; however, if the level varies, the particular designations do not give accurate results and it is necessary to vary the setting of the pointer to obtain the desired ratio. This is accomplished by providing the scale with horizontal lines 87 spaced apart to designate variation in inches between the levels of liquids in the respective tanks.

Diagonal lines are then drawn across the height of the scale as indicated at 88 to a point designated 89 which corresponds in scale to the height of the pump inlet above the bottom of the tanks.

Assuming that the difference between each line represents six inches in difference of levels, then by setting the pointer at the crossing of the diagonal line for the particular ratio desired, the valve will be in position to maintain the desired ratio.

While it is intended that the ratio of the respective liquids should not be greater than 50 per cent of the liquid contained in the tank 18, if a greater ratio is desired, the pointer may be correspondingly adjusted on the scale reading to the left on the designation "50".

The pointer which is associated with the scale is best illustrated in Fig. 4 and includes a bar 90 slidably mounted in a T-shaped slot formed in the head 68 of the arm 65. The bar is retained in adjusted position in the head by a set screw 91 mounted in a threaded opening therein and having its threaded shank engaging against the side of the bar as best illustrated in Fig. 5.

In setting the apparatus constructed and assembled as described, the valve is positioned so that an equal number of apertures are exposed on the opposite sides of the partition 39. When in this position, the brace bar 56 will lie directly over the upper edge of the partition 39. The band carrying the scale will then be moved so that the point 92 on the end of the bar 90 will register with the graduation "50" of the scale. The scale is then locked in this position by means of a set screw 93 having a shank 94 threadedly mounted in an opening 95 in the band so that the end thereof may be engaged with the casing to anchor the band in adjusted position.

In this position of the band, the pointer will register with one of the zeros on the scale whenever the port in the valve is in complete registry with one or the other of the groups of apertures.

The levels of the liquids in the tanks are ascertained by means of tape gauges 96 and 97 that are located in the pump housing and are visible through opening 98 therein. The tapes are wound on a drum 99 and tensioned by a spring 100 having one end fixed to the drum and the other end to a shaft upon which the drum is rotatably mounted. The end of the tapes are led through suitable guide ways 101 into the respective tanks where they are connected with floats 102 guidingly supported on rods 103 as best shown in Fig. 1. As the level of liquids recedes in the tank, the float moves therewith to unreel the tapes from the drum. The tape is marked in accordance with the height of the tanks as indicated at 104 in Fig. 2, the designations being visible through suitable openings 105 in the housing enclosing the tape.

In operating the device and assuming that it is desired to prepare a blend having 30 per cent of the low volatile liquid in the tank 18, the arm 65 is moved to the left in Fig. 4 so that the pointer will align with the numeral "30". The pointer will then be adjusted relatively to the horizontal lines on the scale so that it will correspond to the difference in liquid levels in the respective tanks as indicated by the gauges.

Assuming that the difference in levels in the respective tanks is 18 inches, the pointer will be set on the third line, after which the set screw 91 is tightened and the arm is swung to the left until the pointer is directly over the point where the diagonal line from the graduation "30" crosses the third horizontal line. Then when the pump is started to dispense the liquids from the tanks, 70 per cent of the fluid will be drawn from the tank 6 and 30 per cent from the tank 18.

The valve may be similarly adjusted to give any other desired ratio by moving the arm so that the point of the indicator is on the line designating the desired ratio after taking into consideration the difference in levels in the tank.

From the foregoing, it is apparent that I have provided a simple apparatus which may be readily adapted to conventional type dispensing systems whereby gasoline blends may be prepared in direct accordance with the weather conditions prevailing at the time of use.

While I have particularly described my invention as relating to the blending of gasoline and like fuels, it is obvious that it is adapted for blending lubricating oils and other liquids.

What I claim and desire to secure by Letters Patent is:

1. The method of blending liquids in predetermined ratios including conducting flow of separate streams of liquid to be blended from separate sources of supply, proportionately uniting the flow volume of the respective streams in a definite predetermined ratio, and maintaining the total flow volume of the proportionately united streams at a constant value at the time and place of proportioning the ratio of said streams.

2. The method of blending liquids in predetermined ratios including conducting flow of separate streams of liquid to be blended from separate sources of supply, proportioning the flow volume of the respective streams in a definite predetermined ratio, maintaining the total flow volume of said streams at a constant value, and uniting said streams at the time and place of proportioning the ratio of said streams.

3. The method of blending liquids in predetermined ratios including drawing separate streams of liquid bodies to be blended from separate sources of supply under like feeding forces, imposing variable predetermined differential resistances to the separate streams of liquid whereby effective flow volumes of the respective streams bear a definite predetermined ratio to each other, simultaneously adjusting the resistances to maintain constant combined flow volume at any predetermined ratio, and uniting the effective flow volumes of the respective streams.

4. The method of blending liquids including conducting flow of separate streams of liquid to be blended, imposing predetermined differential resistances to the separate streams of liquid for effecting flow of the respective streams in definite predetermined ratios to each other, uniting the effective flow volumes of the respective streams, and maintaining the combined flow volume of said united liquids constant with variations in said ratios.

5. The method of blending liquids in predetermined ratios including conducting flow of separate streams of liquid to be blended, imposing predetermined differential resistances at common hydrostatic levels in the separate streams of liquid for effecting flow of the respective streams in definite predetermined ratios to each other, maintaining the effective sum total of said resistances at a constant value to maintain invariable total flow volumes, and uniting the effective flow volumes of the respective streams.

6. The method of blending liquids including conducting flow of separate streams of liquid to be blended, imposing predetermined differential resistances at common hydrostatic levels in the separate streams of liquid for effecting flow of the respective streams at definite predetermined ratios to each other, uniting the effective flow volumes of the respective streams, and maintaining the combined flow volume constant with any of said predetermined ratios.

7. The method of blending liquids in predetermined ratios including applying a common suction pressure upon separate liquids to be blended to induce flow of said liquids in separate streams toward the point of suction, imposing variable predetermined differential resistances to the separate streams of liquid for effecting flow of the respective streams in definite predetermined relation to each other, maintaining the effective sum total of said resistances at a constant value to maintain the total flow volumes constant for any predetermined ratio, and uniting the effective flow volumes of the respective streams.

8. The method of blending liquids in predetermined ratios including applying a common suction pressure upon separate liquids to be blended to induce flow of said liquids in separate streams toward the point of suction, imposing variable predetermined differential resistances to the separate streams of liquid at a common hydrostatic level to effect flow of the respective streams in definite predetermined relation to each other, maintaining the effective sum total of said resistances at a constant value to maintain the total flow volumes constant for any predetermined ratio, and uniting the effective flow volumes of the respective streams.

9. An apparatus of the character described including separate tanks for containing liquids to be blended, a single valve proportioning unit having separate proportioning means and a common blending chamber, conduits connecting the proportioning unit with the tanks, and means connected with the proportioning unit for drawing the liquids from said tanks for flow through said proportioning unit to effect a blend of said liquids.

10. An apparatus for blending liquids including means for conducting flow of separate streams of liquid, proportioning means connected with said conducting means for differentially resisting flow of the respective streams of liquid to effect flow of the respective streams in definite predetermined ratio to each other including means for maintaining the total volume of said flow constant, a single actuating means for the proportioning means, and means connected with and forming a part of the proportioning means for uniting the effective flow volumes of said streams.

11. An apparatus for blending liquids including means for conducting flow of separate streams of liquid, a single proportioning means connected with said conducting means for differentially resisting flow of the respective streams of liquid for effecting flow of the respective streams in definite predetermined ratio to each other including means for maintaining the total volume of said flow constant with change in ratio of said streams, means connected with and forming a part of the proportioning means for uniting the effective flow volumes of said streams, and means for dispensing said united streams of liquid.

12. An apparatus for blending liquids, including means for conducting flow of separate streams from separate bodies of liquids to be blended, proportioning means connecting with said conducting means for effecting flow of the respective streams in a definite predetermined ratio to each other including means for maintaining the total volume of said flow constant with change in ratio of said streams, means for adjusting said proportioning means to compensate for variation in hydrostatic levels of said bodies of liquids, and means connecting with and forming a part of the proportioning means for uniting said streams.

13. A liquid blending apparatus including a housing, a partition in the housing dividing the housing into separate compartments and having spaced groups of apertures therein for establishing communication between the compartments, a second partition extending between the groups of apertures and dividing one of the compartments into separate cells, means conducting separate streams of liquid to the respective cells, a pump having its inlet connecting with the other of said compartments for drawing the liquids through the apertures of the respective groups, a valve means movable over the apertures for selectively valving the apertures in one group and rendering a like number of apertures effective in the other group, a scale on the housing, and means connecting with the valve means and movable over the scale for positioning said valve means.

14. A liquid blending apparatus including a housing, a partition in the housing dividing the housing into separate compartments and having spaced groups of apertures therein for establishing communication between the compartments, a second partition extending between the groups of apertures and dividing one of the compartments into separate cells, means conducting separate streams of liquid to the respective cells, a pump having its inlet connected with the other of said compartments for drawing the liquids through the apertures of the respective groups, and a valve means movable over the apertures for selectively valving the apertures in one group and rendering a like number of apertures effective in the other group.

15. A liquid blending apparatus including a housing, a partition in the housing dividing the housing into separate compartments and having spaced groups of apertures therein for establishing communication between the compartments, a second partition extending between the groups of apertures and dividing one of the compartments into separate cells, means conducting separate streams of liquid to the respective cells, a pump having its inlet connected with the other of said compartments for drawing the liquids through the apertures of the respective groups, and valve means in the housing for selectively valving the apertures in one group and rendering a like number of apertures effective in the other group, the total area of the apertures effective at any position of the valve means being substantially equal to the area of the inlet to the pump.

16. A liquid blending apparatus including a housing, a partition in the housing dividing the housing into separate compartments and having spaced groups of apertures therein of an area less than .0045 of a square inch for establishing communication between the compartments, a second partition extending between the groups of apertures and dividing one of the compartments into separate cells, means conducting separate streams of liquid to the respective cells, a pump having its inlet connected with the other of said compartments for drawing the liquids through the apertures of the respective groups, and a valve means in the housing for selectively valving the apertures in one group and rendering a like number of apertures effective in the other group, the total area of the apertures in each respective group being substantially equal to the area of the inlet to the pump.

17. A liquid blending apparatus including a housing, a partition in the housing forming separate compartments therein and having spaced groups of apertures for establishing communication between the compartments, means extending between the groups of apertures to divide one of the compartments into separate cells, a pump having its inlet connected with the other compartment, means conducting separate streams of liquid to the respective cells, a valve plate rotatable in the housing and having a port for progressively exposing apertures in one group and closing a corresponding number of apertures in the other group, a shaft for rotating the valve plate, and a spring for retaining the valve plate in seated relation with the apertured partition.

18. A liquid blending apparatus including a housing, a partition in the housing forming separate compartments therein and having spaced groups of apertures for establishing communication between the compartments, means extending between the groups of apertures to divide one of the compartments into separate cells, a pump having its inlet connected with the other compartment, means conducting separate streams of liquid to the respective cells, a valve plate rotatable in the housing and having a port for progressively exposing apertures in one group and closing a corresponding number of apertures in the other group, a shaft for rotating the valve plate, a spring for retaining the valve plate in seated relation with the apertured partition, an indicator arm on the shaft, and a scale cooperating with the arm for indicating the ratio of the effective apertures in each group.

19. A liquid blending apparatus including a housing, a partition in the housing forming separate compartments therein and having spaced groups of apertures for establishing communication between the compartments, means extending between the groups of apertures to divide one of the compartments into separate cells, a pump having its inlet connected with the other compartment, means conducting separate streams of liquid to the respective cells, a valve plate rotatable in the housing and having a port for progressively exposing apertures in one group and closing a corresponding number of apertures in the other group, a shaft for rotating the valve plate, a spring for retaining the valve plate in seated relation with the apertured partition, an indicating arm on the shaft, an indicator adjustably mounted on said arm, and a scale cooperating with said indicator for indicating the relative flow volume through the effective apertures of said groups at any one position of the valve plate.

20. A liquid blending apparatus including a housing having an outlet chamber and spaced cells respectively communicating therewith through spaced groups of apertures having an area less than .0045 of a square inch, means conducting separate streams of liquid to the respective cells, a pump having its inlet connected with the outlet chamber for drawing the liquids through the apertures of the respective groups, and a valve means in the housing for selectively valving the apertures in one group and rendering a like number of apertures effective in the other group.

21. A liquid blending apparatus including a housing having an outlet chamber and spaced cells communicating respectively with said outlet chamber through spaced groups of apertures, a pump having its inlet connected with the outlet chamber, means conducting separate streams of liquid to the respective cells, and a valve plate rotatable in the housing and having a port for progressively exposing apertures in one group and closing a corresponding number of apertures in the other group.

WARREN F. BLEECKER.